No. 690,025. Patented Dec. 31, 1901.
J. F. KELLER.
MACHINE FOR ENGRAVING OR SINKING DIES.
(Application filed Aug. 2, 1901.)
(No Model.) 4 Sheets—Sheet 2.
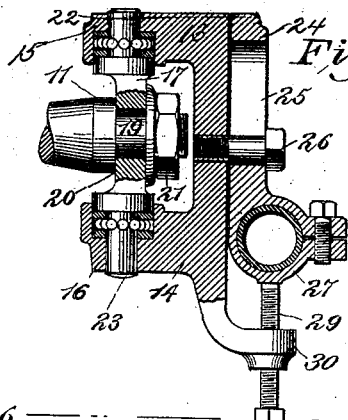
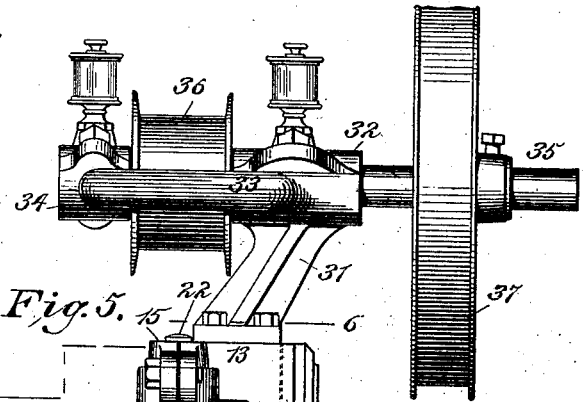
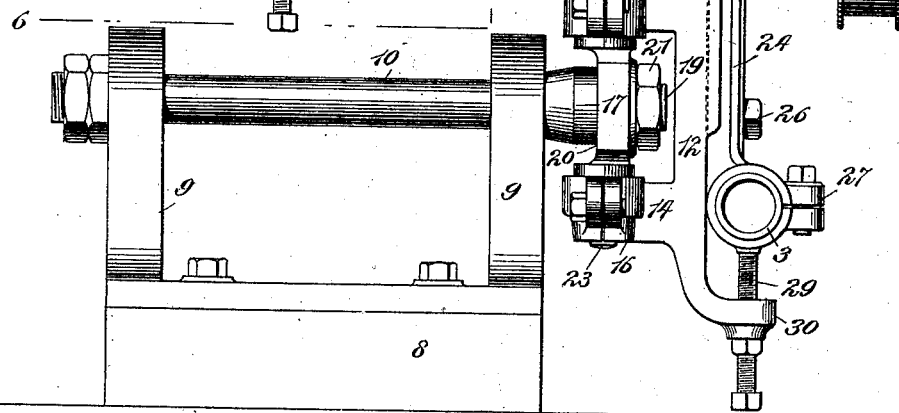
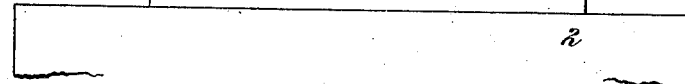
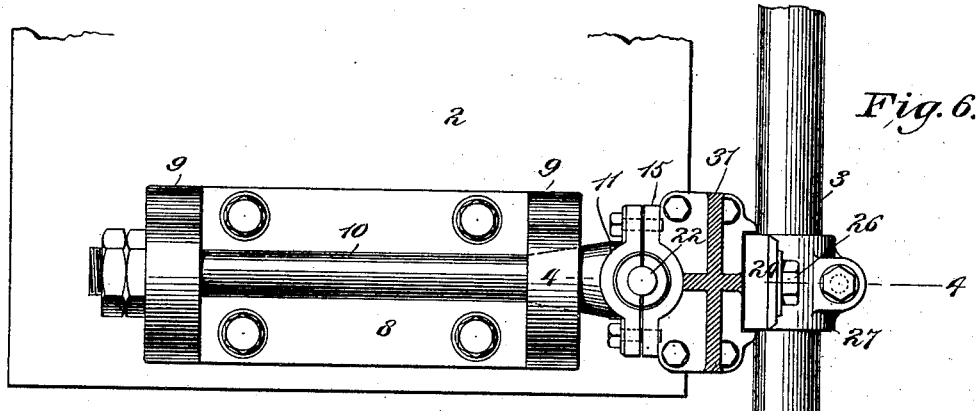
WITNESSES:
M. Van Nortwick.
W. H. Stubbs
INVENTOR
Joseph F. Keller
BY George Cook.
ATTORNEY
THE NORRIS PETERS CO., PHOTO-LITHO., WASHINGTON, D. C.

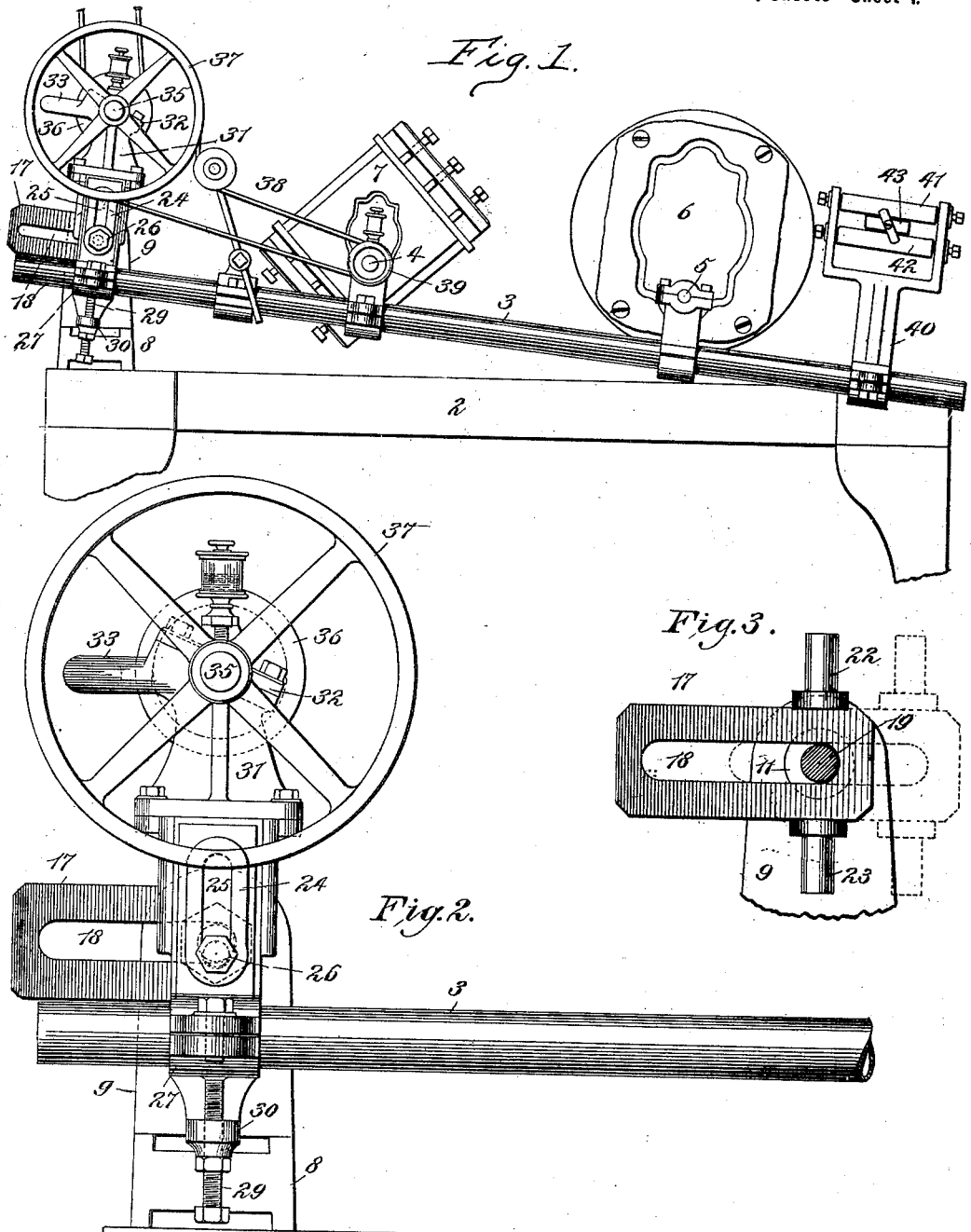

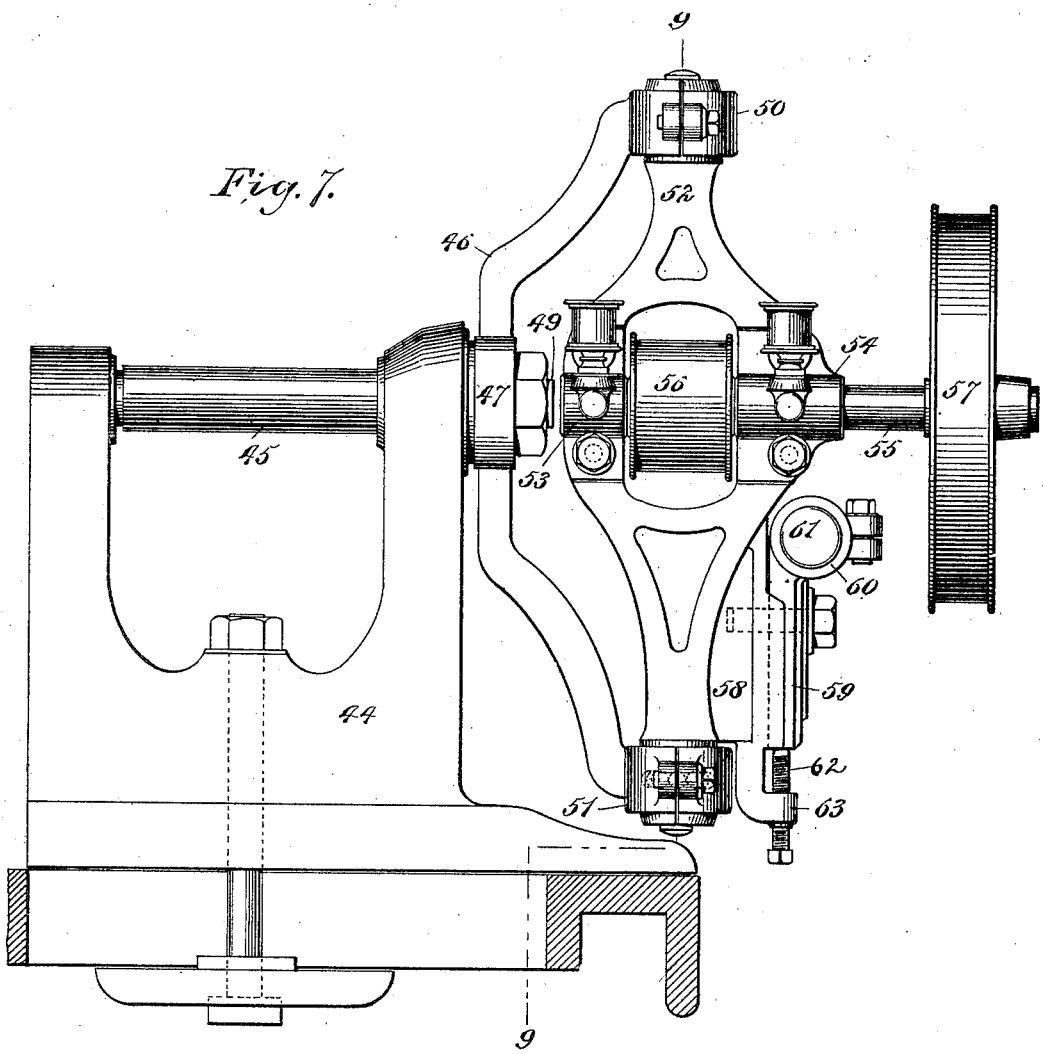

No. 690,025. Patented Dec. 31, 1901.
J. F. KELLER.
MACHINE FOR ENGRAVING OR SINKING DIES.
(Application filed Aug. 2, 1901.)
(No Model.) 4 Sheets—Sheet 4.
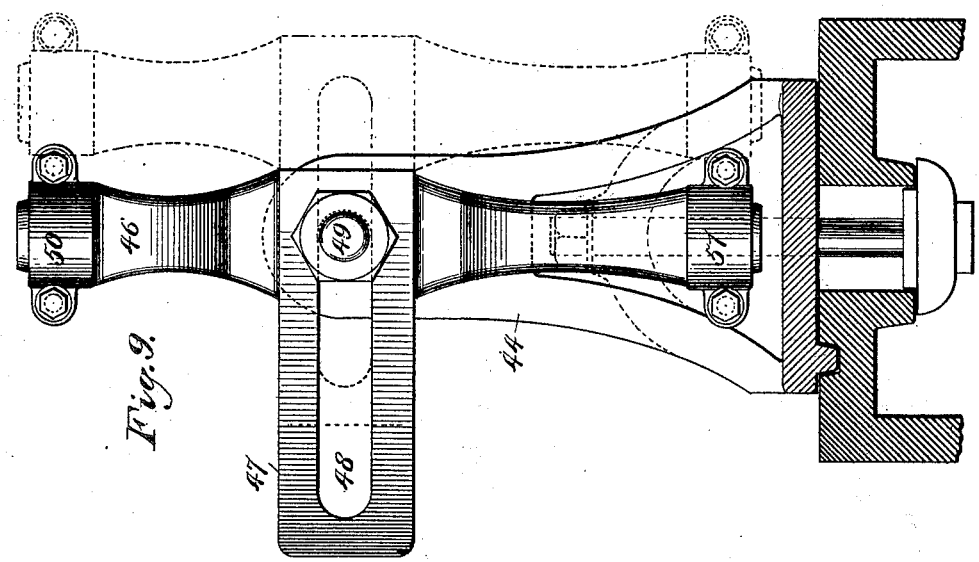
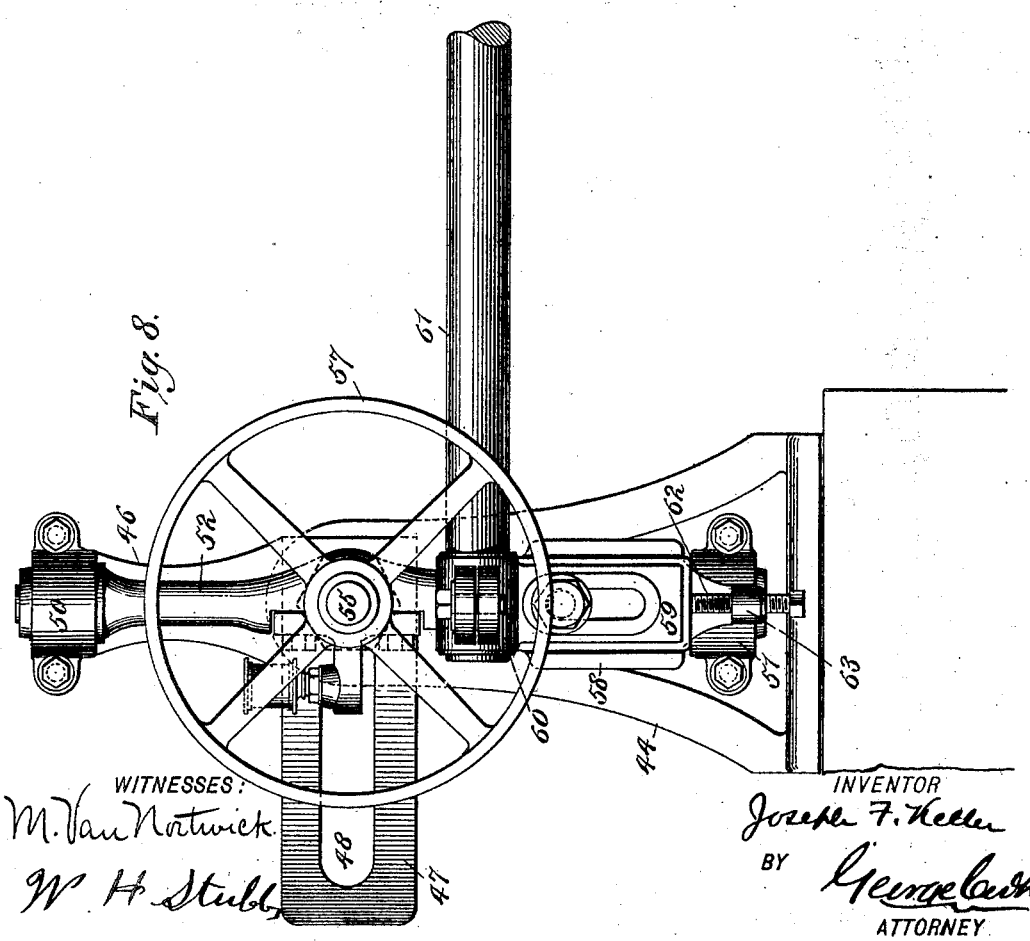
WITNESSES:
M. Van Natwick
W. H. Stubb
INVENTOR
Joseph F. Keller
BY
George Cash
ATTORNEY

UNITED STATES PATENT OFFICE.

JOSEPH FINK KELLER, OF NEW YORK, N. Y., ASSIGNOR TO SYDNEY A. KELLER, OF NEW YORK, N. Y.

MACHINE FOR ENGRAVING OR SINKING DIES.

SPECIFICATION forming part of Letters Patent No. 690,025, dated December 31, 1901.

Application filed August 2, 1901. Serial No. 70,622. (No model.)

*To all whom it may concern:*

Be it known that I, JOSEPH FINK KELLER, a citizen of the United States, and a resident of New York, in the county of New York and State of New York, have made and invented certain new and useful Improvements in Machines for Engraving or Sinking Dies, of which the following is a specification.

My invention relates to an improvement in machines for engraving or sinking dies, and more particularly upon machines like that described and shown in Letters Patent No. 500,317, dated June 27, 1893, granted to L. F. Campi, a number of which machines are in use and are therefore familiar to those skilled in the art. In the patented machine referred to a cutting or engraving tool is caused to follow a path defined by the movements of a pointer or tracer, which latter is kept in contact with the surface of a templet, pattern, or model, the latter being rotated in front of the tracer. Both the engraving-tool and tracer are mounted upon spindles parallel to each other, the templet or pattern and the material to be engraved or sunk in imitation of the pattern being caused to revolve in front of the tracer and engraving-tool, the arm or bar carrying the tracer and engraving-tool being provided at one end with a kind of universal joint to allow the same to be moved around such joint as a fulcrum in vertical and horizontal planes. Further, the cutting-tool is rotated or driven by a band or cord passing around a pulley attached to the spindle carrying said cutting-tool and also around other pulleys secured to various parts of the machine, to one of which pulleys motion is communicated from the main driving-shaft. Experience with machines constructed and arranged in this way has shown that in imparting motion to the cutting-tool by means of cords passing around the various pulleys sufficient power could not be obtained whereby to effect a strong or deep cutting. Nor is it possible to substitute a belt or band for the cord, as in such instance the strain imposed thereby would tend to twist the bracket carrying the pulley and its attached shaft or bar, thereby destroying the effectiveness of the machine, it being understood that it is of the utmost importance that said shaft or bar be allowed to freely move in every direction in order that the tracer or pointer may follow the finest lines in intaglio and in relief, whereby the cutting-tool may accurately reproduce the same in the die under operation.

The object of my present invention is to improve upon the manner in which said bar or arm is hung and the manner of imparting a rotary movement to the cutting-tool mounted on said bar, whereby the sensitiveness of the movement of said bar may be increased and at the same time permit of more power being transmitted to the cutting-tool, the invention consisting in certain novel features of construction and combinations of parts, as will be hereinafter fully described, and pointed out in the claims.

In the accompanying drawings, Figure 1 is a view in side elevation of a part of an engraving-machine having my improvement embodied therein. Fig. 2 is a similar view of the supporting-bracket. Fig. 3 is a detail view of several of the parts. Fig. 4 is a sectional view of the lower end of the bracket, taken on the line 4 4 of Fig. 6. Fig. 5 is a view in end elevation of the bracket. Fig. 6 is a horizontal sectional view taken on the line 6 6 of Fig. 5. Fig. 7 is a view in end elevation of a modified form of my improvement, and Fig. 8 is a side view of the same. Fig. 9 is a view taken on the line 9 9 of Fig. 7, the bracket and parts supported thereby being removed.

Referring to the drawings, 2 represents the bed or frame of the machine, 3 the bar or arm upon which are mounted the spindle 4, carrying the cutting-tool, and the spindle 5, carrying the tracer, 6 representing the model, templet, or pattern, and 7 the piece of metal out of which the die is cut, said model 6 and metal 7 being mounted to rotate in front of their respective working tools in the usual manner.

To the bed 2 of the machine is secured a head-stock, consisting of the base 8, arms or brackets 9, and spindle or shaft 10, adapted to turn or rotate in said brackets, one end 11 of said spindle projecting out beyond its support and adapted to carry a bracket, which latter in turn carries or supports the movable rod or bar, as hereinafter explained. This bracket (shown in section in Fig. 4) is constructed with a vertical arm 12 and the upper and lower horizontal arms 13 14, the extreme ends of these horizontal arms being provided with the bearing-boxes 15 16. In this bracket and between the horizontal arms 13 14 fits the plate 17, provided with an elongated slot 18, through which slot projects the reduced end 19 of the spindle 10 of the head-stock before referred to, the reduction of the end of said spindle 10 forming a shoulder 20, against which said plate 17 is held or bound by means of the nut 21. This plate 17 has secured thereto or formed integral therewith the posts or lugs 22 23, adapted to fit in the bearings 15 16, ball-bearings being provided therefor, if desired, as illustrated in Fig. 4. By this construction and arrangement of parts it will be understood that the bracket is allowed a rotating movement with the spindle 10 of the head-stock and at the same time a horizontal or swinging movement on the plate 17.

To the front side of the swinging bracket is secured the plate 24, provided in its length with the vertical elongated slot 25, through which passes the bolt 26, the end of the latter being threaded into the vertical arm 12 of the bracket, this arrangement allowing of a vertical adjustment of said plate 24 with relation to said bracket. The bracket may also be adjusted horizontally by loosening the nut 21, whereupon the plate 17 is allowed to be moved on the end 19 of the spindle 10, as indicated in dotted lines, Fig. 3, until the proper adjustment is secured, whereupon by tightening said nut the plate 17, carrying said swinging bracket, will be held stationary with relation to said spindle. The lower end of this plate 24 is shaped into a split sleeve or collar 27, into which is fitted and secured one end of the bar or rod 3, said rod being stationary with relation to the bracket and its supporting-plate and vertically adjustable with the latter by means of the screw 29, passing through the extended end 30 of the bracket and bearing at its upper end against the sleeve or collar 27, as illustrated in Fig. 4 of the drawings.

It will be understood from the foregoing that in order to vertically adjust the rod 3 it is simply necessary to loosen the bolt 26, whereupon by turning the adjusting-screw 29, threaded in the arm 30, the plate 24, with its attached rod 3, may be raised or lowered to its proper position and there secured by turning up the bolt 26. To adjust this rod horizontally, the bracket and plate are moved upon the end of the spindle 10, as hereinbefore described. To the upper horizontal arm 13 of the swinging bracket is bolted or otherwise secured the arm or support 31, provided at its upper end with the bearing 32, from which extends the arm or yoke 33, the latter being provided at its outer or free end with the bearing 34, in which said bearings 32 34 is mounted the horizontal shaft 35, carrying the pulley 36 between said bearings, and by means of which pulley motion is imparted to said shaft by means of a belt (not shown) leading to overhead shafting or some other suitable source of power. To the shaft 35 is also secured the pulley 37, over which passes the belt or cord 38, the latter passing around the pulley 39, secured to the spindle 4, which latter, as before described, carries the cutting-tool. By these means the motion of the shaft 35 is imparted through the pulley 37, belt 38, and pulley 39 to the cutting-tool, it being understood that when the machine is in operation the swinging bracket supporting the arm 3 and the means for imparting the rotary movement to the cutting-tool all move with said arm and retain the same relation therewith. It will be further seen that by this arrangement the strain of the belt passing around the pulley 36 is in a direct and vertical line with the bearings 15 16 of the swinging bracket, this relation of parts being maintained at all times, the purpose and effect of which are to prevent all danger of any twisting strain being imposed upon said bracket to thereby interfere with its free, delicate, and sensitive movements and that of its attached arm 3.

The free end of the bar 3 is carried in the bracket 40, provided with the rollers 41 42, between which is the supporting-bar 43, this arrangement allowing said bar to move horizontally as the pointer or tracer follows the elevations and depressions in the pattern, means (not shown) being also provided to feed the bracket 40, with its attached rod 3, vertically in order to allow both the tracer and cutting-tool carried on said bar to approach the circumference of the pattern and the die under operation. As this bracket 40 and its attached parts and also the means for vertically moving the same are constructed and operated in the same way as those in machines as ordinarily constructed and as such form no part of my invention, no detail description thereof is necessary.

In Figs. 7, 8, and 9 I have illustrated a modified form of my device, 44 representing the head-stock, and 45 the rotating spindle mounted therein, and on the projecting end of which spindle is secured the bracket 46, provided with the plate 47, the latter having formed therein the elongated slot 48, through which projects the reduced end 49 of said spindle 45, allowing of the horizontal adjustment of the bracket and its attached parts, as hereinbefore described. The ends of the brackets are provided with bearings 50 51, in which are mounted the ends of the support 52, the latter being provided in turn with the bearing-boxes 53 54. A shaft 55 is mounted in said bearings 53 54 and carries the pulley 56 for imparting motion to said shaft and also a pulley 57, which corresponds with the pulley 37, hereinbefore referred to. The support 52 is also provided with the bracket 58, which in turn has secured thereto the vertically-adjustable plate 59, formed with the split collar or sleeve 60 for the reception of the end of the arm 61, which corresponds with the arm 3, before referred to. The plate 59 is adjusted by means of the screw 62, passing through the bent end 63, formed on the bracket 58, as in the first instance. This modified form is in all respects similar to the device first described, excepting the shape of the several parts and the fact that the pulleys 56 57 are lowered into the same horizontal plane with that of the spindle in the head-stock, the important feature of my invention, however, being preserved in that the strain of the belt imposed upon the pulley 56 is in a direct and vertical line with the bearings formed on the ends of the bracket 46, thereby overcoming all danger of any twisting strain being imparted to said bracket and its attached arm.

Having fully described my invention, what I claim as new, and desire to secure by Letters Patent, is—

1. In a machine of the character described, the combination with a horizontally-adjustable bracket adapted to swing vertically and horizontally, of a bar, one end of which is supported by said bracket and is vertically and horizontally adjustable thereon, a cutting-tool carried by and movable upon said adjustable bar, a horizontal shaft carried by said bracket, and having a pulley secured thereto and in alinement with the vertical bearings of said bracket, and means for imparting the motion of said shaft to said cutting-tool, substantially as described.

2. In a machine of the character described, the combination with a horizontally-adjustable bracket provided with bearings and supported on said machine, of a vertically-adjustable plate secured to said bracket, a bar supported in said plate, a cutting-tool mounted on said bar, a shaft carried by said bracket, and having a pulley connected therewith to impart motion to said cutting-tool, and a pulley connected with said shaft to impart motion thereto, and in alinement with the bearings of said bracket, substantially as described.

3. In a machine of the character described, the combination with a head-stock having a spindle rotating therein, of a plate adjustably secured to said spindle, a swinging bracket mounted on said plate, an arm supported on said bracket, a cutting-tool mounted on said arm, a shaft carried by said bracket, and having a pulley connected therewith to impart motion to said cutting-tool, and a pulley connected with said shaft to impart motion thereto and in alinement with the bearings of said swinging bracket, substantially as described.

4. In a machine of the character described, the combination with a head-stock having a spindle rotating therein, of a plate adjustably secured to said spindle, a bracket provided with bearings and mounted on said plate, a bar adjustably secured to said bracket, a cutting-tool mounted on said bar, a shaft carried by said bracket and provided with a pulley for imparting motion to said cutting-tool, and a pulley secured to said shaft for imparting motion thereto, and in alinement with the bearings of said bracket, substantially as described.

Signed at New York, in the county of New York and State of New York, this 31st day of July, A. D. 1901.

JOSEPH FINK KELLER.

Witnesses:
GEORGE COOK,
M. VAN NORTWICK.